(12) United States Patent
Yin et al.

(10) Patent No.: US 11,579,263 B2
(45) Date of Patent: Feb. 14, 2023

(54) METHOD AND APPARATUS FOR A HYBRID TIME-OF-FLIGHT SENSOR WITH HIGH DYNAMIC RANGE

(71) Applicant: Taiwan Semiconductor Manufacturing Co., Ltd., Hsin-Chu (TW)

(72) Inventors: Chin Yin, Tainan (TW); Meng-Hsiu Wu, Hsin-Chu (TW); Chih-Lin Lee, Toufen (TW); Calvin Yi-Ping Chao, Zhubei (TW); Shang-Fu Yeh, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 677 days.

(21) Appl. No.: 16/656,424

(22) Filed: Oct. 17, 2019

(65) Prior Publication Data
US 2020/0174105 A1    Jun. 4, 2020

Related U.S. Application Data

(60) Provisional application No. 62/773,087, filed on Nov. 29, 2018.

(51) Int. Cl.
*G01S 7/00* (2006.01)
*G01S 7/4863* (2020.01)
(Continued)

(52) U.S. Cl.
CPC .......... *G01S 7/4863* (2013.01); *G01S 7/4865* (2013.01); *G01S 7/4914* (2013.01); *G01S 17/10* (2013.01); *G01S 17/32* (2013.01); *G01S 17/89* (2013.01)

(58) Field of Classification Search
USPC ........................................ 356/5.01
See application file for complete search history.

(56) References Cited

U.S. PATENT DOCUMENTS 9,209,320 B1 * 12/2015 Webster ............ H01L 31/02027
9,516,244 B2 * 12/2016 Borowski ............... G01S 17/90
(Continued)

FOREIGN PATENT DOCUMENTS

EP         3460508 A1 *  3/2019 ............. G01S 17/10

OTHER PUBLICATIONS

Bronzi, D. et al., "100 000 Frames/s 64 x 32 Single-Photon Detector Array for 2-D Imaging and 3-D Ranging", IEEE Journal of Selected Topics in Quantum Electronics, Nov./Dec. 2014, 20(6), 3804310, 10 pages.
(Continued)

*Primary Examiner* — James R Hulka
(74) *Attorney, Agent, or Firm* — Duane Morris LLP

(57) ABSTRACT

Disclosed is a time-of-flight sensing apparatus and method. In one embodiment, a system for time-of-flight (TOF) sensing, comprising: a detector array comprising a plurality of single-photon avalanche detectors (SPADs); and a control circuit comprising at least two digital control arrays coupled to the detector array, a counter array coupled to the at least two digital control arrays, and a logical control unit coupled to the counter array and the at least two digital control arrays, wherein the detector array is configured to receive at least one reflected light pulse from a target, wherein a first digital control array, the counter array, and the logical control unit of the control circuit are configured to receive at least one avalanche pulses from each of the plurality of SPADs to determine a first distance between the detector array and the target in a first TOF mode, and wherein a second digital control array, the counter array, and the
(Continued)

logical control unit of the control circuit are configured to receive the at least one avalanche pulse from the each of the plurality of SPADs to determine a second distance between the detector array and the target in a second TOF mode.

16 Claims, 9 Drawing Sheets

(51) Int. Cl.
    *G01S 7/4865*     (2020.01)
    *G01S 17/32*     (2020.01)
    *G01S 7/4914*     (2020.01)
    *G01S 17/10*     (2020.01)
    *G01S 17/89*     (2020.01)

(56) References Cited

U.S. PATENT DOCUMENTS

| | | | | |
|---|---|---|---|---|
| 10,267,901 B2* | 4/2019 | Drader | | G01S 7/487 |
| 2006/0192086 A1* | 8/2006 | Niclass | | H01L 31/107 |
| | | | | 257/E31.063 |
| 2006/0202129 A1* | 9/2006 | Niclass | | G01S 17/894 |
| | | | | 250/370.14 |
| 2007/0182949 A1* | 8/2007 | Niclass | | G01S 7/491 |
| | | | | 356/3 |
| 2010/0127160 A1* | 5/2010 | Niclass | | G01S 17/10 |
| | | | | 250/214 R |
| 2013/0300838 A1* | 11/2013 | Borowski | | H04N 5/335 |
| | | | | 348/46 |
| 2017/0139041 A1* | 5/2017 | Drader | | G01S 7/487 |
| 2019/0004156 A1* | 1/2019 | Niclass | | H01L 31/107 |
| 2020/0326414 A1* | 10/2020 | Delic | | G01S 7/4802 |
| 2021/0165083 A1* | 6/2021 | Fine | | H01L 27/14856 |

OTHER PUBLICATIONS

Niclass, C. et al., "A 128 x 128 Single-Photon Image Sensor With Column-Level 10-Bit Time-to-Digital Converter Array", IEEE Journal of Solid-State Circuits, Dec. 2008, 43(12):2977-2989.

Niclass, C. et al., "Desoign and Characterization of a CMOS 3-D Image Sensor Based on Single Photon Avalanche Diodes", IEEE Journal of Solid-State Circuits, Sep. 2005, 40(9):1847-1854.

* cited by examiner

METHOD AND APPARATUS FOR A HYBRID TIME-OF-FLIGHT SENSOR WITH HIGH DYNAMIC RANGE

BACKGROUND

Time-of-flight (TOF) measurement of a ray of light generated by a mono-chromatic or wide-spectral light source can be used in applications, such as 3-D imaging. The measurement is based on a detection of a light from the source which is reflected by the target to a detector. There exist at least two techniques to measure the TOF: a direct method and an indirect method. In the direct method, the time difference between a START pulse, synchronized with the light source, and a STOP signal generated by the detector is evaluated. In the indirect method, a continuous sinusoidal light wave is emitted and the phase difference between outgoing and incoming signals is measured, which is used to determine the time difference using a predefined algorithm. Single-photon avalanche diodes (SPADs) are detectors capable of capturing individual photons with very high time-of-flight resolution. However, SPADs normally have high power consumption and difficult to achieve high resolution depth map over a wide detection range used in both direct and indirect TOF methods. This disclosure exploits a method and apparatus for a hybrid TOF sensor with high dynamic range based on a single-photon avalanche diode.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

DETAILED DESCRIPTION OF EXEMPLARY EMBODIMENTS

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

This disclosure presents various embodiments of apparatus and method for performing a time-of-flight (TOF) measurement. A TOF system which can operate in a direct TOF mode and an indirect TOF mode, offers advantages such as a high dynamic range.

Figure 1:
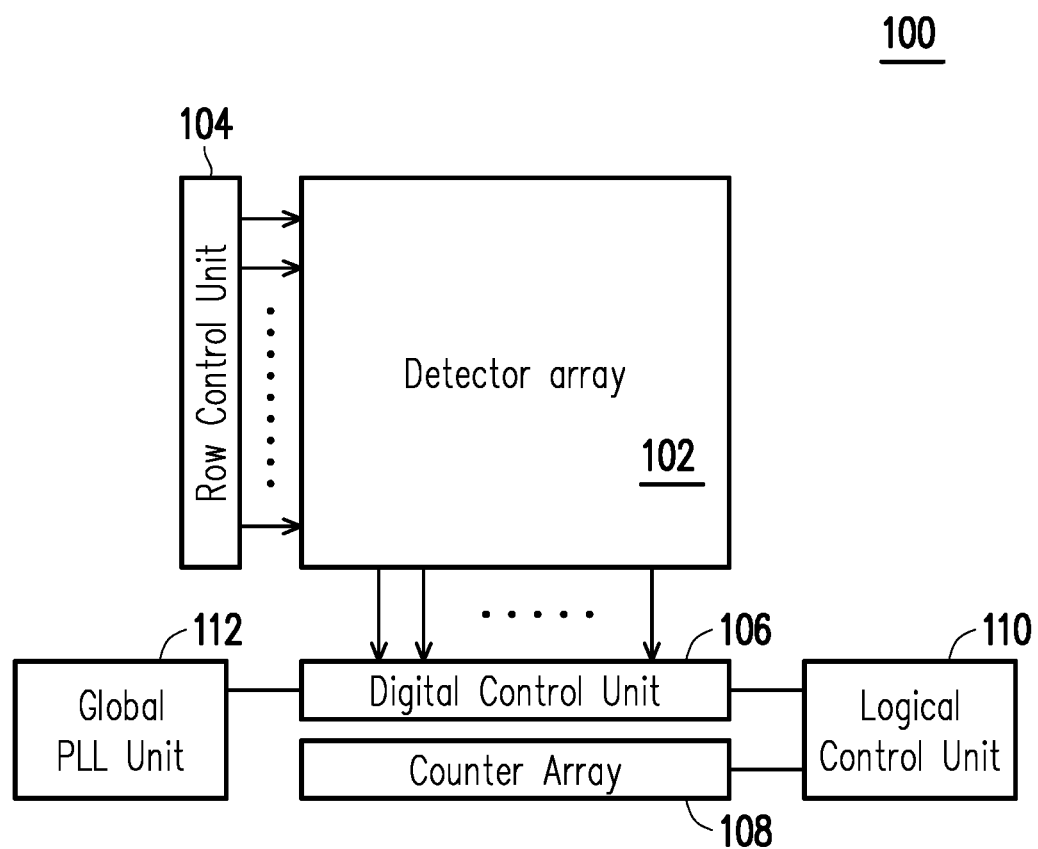
FIG. 1 illustrates an exemplary block diagram of a time-of-flight (TOF) sensing system, in accordance with some embodiments of present disclosure.

FIG. 1 illustrates an exemplary block diagram of a time-of-flight (TOF) sensing system 100, in accordance with some embodiments of present disclosure. It is noted that the TOF sensing system 100 is merely an example, and is not intended to limit the present disclosure. Accordingly, it is understood that additional functional blocks may be provided in or coupled to the TOF sensing system 100 of FIG. 1, and that some other functional blocks may only be briefly described herein.

In the illustrated embodiment, the TOF sensing system 100 comprises a detector array 102, a row control unit 104, a digital control unit 106, a counter array unit 108, a logical control unit 110, and a global phase-locked-loop (PLL) unit 112. In some embodiments, the detector array 102 comprises a plurality of single-photon avalanche detectors (SPADs) in a column-row configuration.

In some embodiments, the row control unit 104 is configured to receive a row address of the detector array 102 and enable the detectors in that row address. In some embodiments, the digital control unit 106 comprises two components wherein a first component of the digital control unit 106 is configured to perform as a multiplexer so as to divide the SPAD input pulse into an in-phase counter and an out-of-phase counter when the system works in an indirect time-of-flight (ITOF) mode, and a second component of the digital control unit 106 is configured to perform as a time-to-digital converter to acquire a time difference between a LASER start pulse and at least one avalanche pulse from the detector array (e.g., SPAD) 102 when the system works in a direct time-of-flight (DTOF) mode. In some embodiments, the first and second components of the digital control unit 106 each comprises a plurality of sub-units, each of which is coupled to a column of the detector array 102, as discussed in detail further below.

In some embodiments, the counter array 108 is configured to count the input pulse number of in-phase/out-of-phase portion when the system works in the ITOF mode, and count the time difference when the system works in the DTOF mode. In some embodiments, the counter array 108 is coupled to the first and second components of the digital control unit 106. In some embodiments, the counter array 108 comprises a plurality of counter units, each of which is coupled to one sub-unit in the first and second components of the digital control unit 106, as discussed in detail further below.

In some embodiments, the digital control unit 106 and the counter array 108 are coupled together through the logical control unit 110. In some embodiments, the logical control unit 110 is configured to determine the input of the digital control unit 106 according to the output of the counter array 108, which is discussed in detail below in FIG. 3A.

In some embodiments, the global PLL unit 112 is configured to provide a high frequency clock for the counter array 108 when the system works in the DTOF mode.

Figure 2:
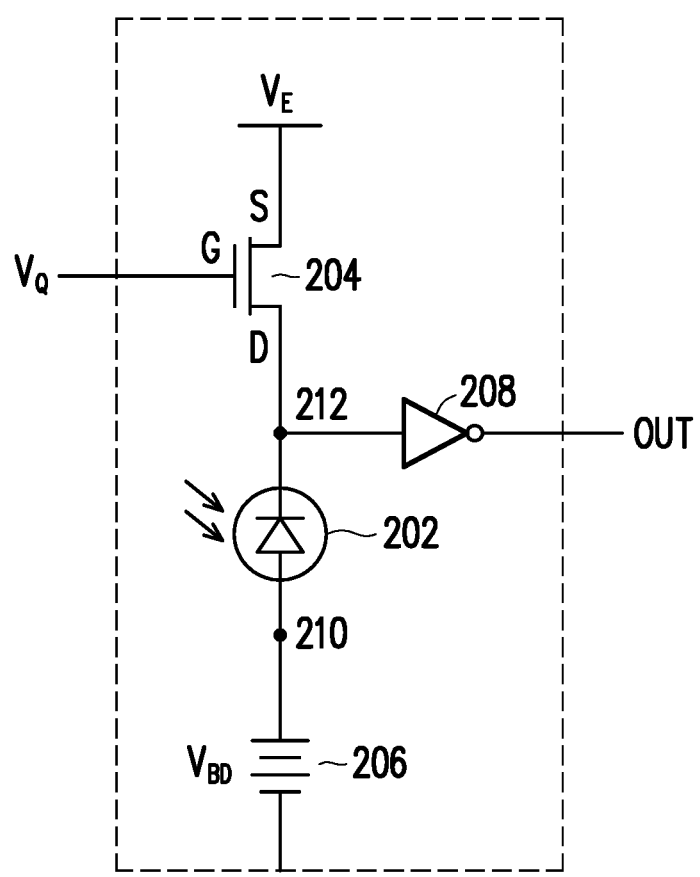
FIG. 2 illustrates an exemplary circuit diagram of a single-photon avalanche detector (SPAD), in accordance with some embodiments of present disclosure.

FIG. 2 illustrates an exemplary circuit diagram of a single-photon avalanche detector (SPAD) 200, in accordance with some embodiments of present disclosure. The SPAD 200 comprises a photodiode 202, which relies on impact ionization effects to multiply photo-generated electrons and holes. In some embodiments, the photodiode 202 can be fabricated in a silicon wafer or through a standard Complementary metal-oxide-semiconductor (CMOS) manufacturing process. In some embodiments, the photodiode 202 can be fabricated using group III-V semiconducting materials. In some embodiments, terminal 210 of the photodiode 202 is biased at a breakdown voltage ($V_{BD}$) 206 so as to allow the photodiode 202 to operate under a pseudo-steady-state condition, in which no carriers exists in the depletion region of the photodiode 202. When a photon is received at the photodiode 202, carriers (e.g., an electron and a hole) can be generated and injected to the depletion region causing impact ionization and avalanche. In some embodiments, the VBD 206 is in a range of −30~−40 V.

In the illustrated embodiments, terminal 212 of the photodiode 202 is further coupled to an excessive bias voltage ($V_E$) through a transistor 204. In some embodiments, $V_E$ is in a range of 1 V-5 V. In some embodiments, $V_E$ is 3.3 V by default. The drain terminal of the transistor 204 is coupled to terminal 212 of the photodiode 202, the source terminal of the transistor 204 is coupled to the $V_E$ and the gate terminal of the transistor 204 is coupled to a quench voltage ($V_Q$). When the voltage difference between the $V_Q$ and $V_E$ is greater than the threshold voltage of the transistor 204, the transistor 204 is turned on, resulting in a greater voltage difference between the two terminals 210 and 212 of the photodiode 202. In some embodiments, the transistor 204 performs as a constant current source with a constant effective resistance value. When reflected light is received on the photodiode 202 and avalanche effect is triggered, a large amount of pull-down current is produced, resulting the drain terminal of the transistor 204 and the terminal 212 turning low immediately due to the resistance of the transistor 204. In some embodiments, the transistor 204 is a PMOS quench transistor. In some embodiments, the resistance value of the transistor 204 can be adjusted by adjusting the $V_Q$ value. In some embodiments, the change of the VQ value can also cause a change in the turn-low slew rate at the terminal 212 when the avalanche effect on the photodiode 202 is triggered.

In the illustrated embodiment, the terminal 212 of the photodiode 202 is coupled to an inverter 208. In some embodiments, the inverter 208 is configured to level-shift and reshapes the avalanche pulse into a logic-core voltage pulse. In some embodiments, the inverter 208 comprises a plurality of inverter cells coupled together in series. In some embodiments, a first inverter cell in the inverter 208 further comprises a high-voltage (e.g., I/O voltage) transistor with a logic-core voltage power supply, because of reliability issue from SPAD high voltage. The rest of inverter cells in the inverter 208 each comprises a logic-core voltage transistor and is configured to reshape the avalanche pulse for subsequent time-to-digital converter (TDC) circuit.

Figure 3A:
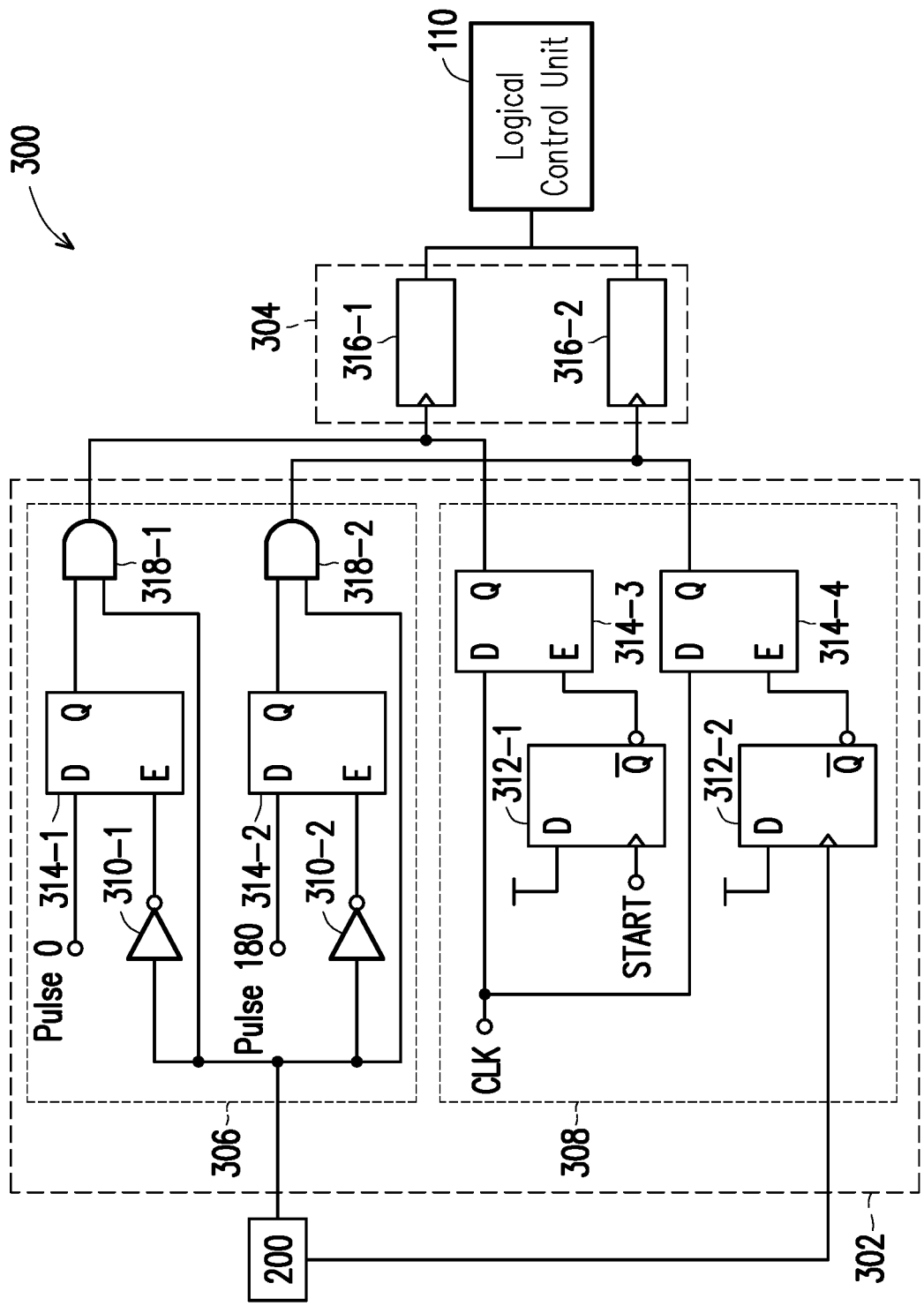
FIG. 3A illustrates an exemplary circuit diagram of a time-of-flight (TOF) sensing system, in accordance with some embodiments of the present disclosure.

FIG. 3A illustrates an exemplary circuit diagram of a time-of-flight (TOF) sensing system 300, in accordance with some embodiments of the present disclosure. In some embodiments, the TOF sensing system 300 comprises a sub-unit 302 of a logical control unit 106 and a counter unit 304 of a counter array 108. In some embodiments, the TOF sensing system 300 is coupled to a column of SPADs 200 in a SPAD array 102 for receiving avalanche pulses and further coupled to a logical control unit 110 for determining a distance and also determining the mode of the system.

In some embodiments, the sub-unit 302 of the logical control unit 106 comprises 2 components, a first component 306 and a second component 308. In some embodiments, the counter unit 304 comprises two counters 314, including a first counter 314-1 and a second counter 314-2. In some embodiments, the first and second counters each is coupled to both the first and second components 306, 308.

In some embodiments, the first component 306 comprises two identical digital switches, wherein the two identical digital switches each comprises an inverter 310, a latch 314 and an "AND" gate 318. Specifically, the first digital switch comprises a first inverter 310-1, a first latch 314-1, and a first "AND" gate 318-1; and the second digital switch comprises a second inverter 310-2, a second latch 314-2, and a second "AND" gate 318-2. Similarly, the second component 308 comprises two identical circuits, wherein the two identical circuits each comprises a D-flip flop (DFF) circuit 312 and a latch 314. Specifically, a first circuit of the second component 308 comprises a first DFF circuit 312-1 and a third latch 314-3; and the second circuit comprises a second DFF circuit 312-2 and a fourth latch 314-4. In some embodiments, outputs of the first "AND" gate 318-1 of the first component 306 and the third latch 314-3 of the second component 308 are both coupled to the first counter 316-1. In some embodiments, outputs of the second "AND" gate 318-2 of the first component 306 and the fourth latch 314-4 of the second component 308 are both coupled to the second counter 316-2.

In the illustrated embodiment, terminal D of the first latch 314-1 in the first component 306 receives an input pulse signal (i.e., an in-phase pulse); terminal E of the first latch 314-1 in the first component 306 receives an input pulse signal (i.e., avalanche pulses) from a column of SPADs 200 in the SPAD array 102 through the first inverter 310-1; and terminal Q of the first latch 314-1 in the first component 306 and the input pulse signals from the column of SPADs 200 in the SPAD array 102 are further coupled to the first "AND" gate 318-1. Similarly, terminal D of the second latch 314-2 in the first component 306 receives an input pulse signal (i.e., an out-phase pulse); terminal E of the second latch 314-2 in the first component 306 receives an input pulse signal (i.e., avalanche pulses) from a column of SPADs 200 in the SPAD array 102 through the second inverter 310-2; and terminal Q of the second latch 314-2 in the first component 306 and the input pulse signals (i.e., avalanche pulses) from the column of SPADs 200 in the SPAD array 102 are further coupled to the second "AND" gate 318-2. In the illustrated embodiments, output terminals of the first "AND" gate 318-1 and the second "AND" gate are further coupled to the first and second counters 316-1/316-2, respectively.

In the illustrated embodiments, all the logic circuits are reset first. Terminal D of the first DFF circuit 312-1 of the second component 308 fixes into a logic "high" signal; terminal C of the first DFF circuit 312-1 of the second component 308 receives an input pulse signal (i.e., LASER start light pulse) from the column of SPADs 200 in the SPAD array 102; and terminal Q-bar of the first DFF circuit 312-1 of the second component 308 is coupled to terminal E of the third latch 314-3 of the second component 308. In the illustrated embodiment, terminal D of the third latch 314-3 of the second component 308 receives a clock signal (i.e., CLK) from the global PLL unit 112; and terminal Q of the third latch 314-3 of the second component 308 is finally coupled to the first counter 316-1. Similarly, terminal D of the second DFF circuit 312-2 of the second component 308 fixes into a logic "high" signal; terminal C of the second DFF circuit 312-2 of the second component 308 receives the input pulse signals (i.e., avalanche pulses) from the column of SPADs 200 in the SPAD array 102; and terminal Q-bar of the second DFF circuit 312-2 of the second component 308 is coupled to terminal E of the fourth latch 314-4 of the second component 308. In the illustrated embodiment, terminal D of the fourth latch 314-4 of the second component 308 receives a clock signal (i.e., CLK) from the global PLL unit 112; and terminal Q of the fourth latch 314-4 of the second component 308 is finally coupled to the second counter 316-2.

In some embodiments, the first component 306 is configured to operate as a logic multiplexer. For example, during an in-phase period (e.g., a period where the in-phase pulse is high on the terminal D of the first latch 314-1 and the out-phase pulse is low on the terminal D of the second latch 314-2), the input avalanche pulses from a SPAD 200 in the column are all output into the first counter 316-1 through the first latch 314-1 and the first "AND" gate 318-1 of the first component 306 and through the first DFF circuit 312-1 and the third latch 314-3 of the second component 308. Similarly, during an out-of-phase period (e.g., a period where the in-phase pulse is low on the terminal D of the first latch 314-1 and the out-phase pulse is high on the terminal D of the second latch 314-2), all avalanche pulses from the SPAD 200 in the column are then output into the second counter 316-2 through the second latch 314-2 and the second "AND" gate 318-2 of the first component 306 and through the second DFF circuit 312-2 and the fourth latch 314-4 of the second component 308. In some embodiments, the first component 306 is configured as a "Gated Clock Latch" so as to prevent a glitch issue which occurs at the edge between the in-phase and the out-of-phase clock. In some embodiments, the first component 306 allows an input avalanche pulse at the edge of the two phases (i.e., in-phase and out-phase pulses) being count into the first counter 316-1 only, e.g., when both terminals D and E are high on the first component 306.

In some embodiments, the second component 308 is configured to operate as a signal edge detector. For example, when the LASER start light pulse is received on the first DFF circuit 312-1, the CLK pulses are blocked by the third latch 314-2 and the output terminal of the third latch 314-3 switches from high to low (i.e., stop COUNTER 1); and when the input avalanche pulses are received on the second DFF circuit 312-2, the CLK pluses are blocked by the fourth latch 314-4, and the output terminal of the fourth latch 314-4 switches from high to low (i.e., stop COUNTER 2).

In the illustrated embodiments, the logical control unit receives signals from the first and the second counters 316-1/316-2 to determine a distance when the system operates under ITOF mode (i.e., the counters receiving signals from the first component 306) according to the equation below:

$$D_1 = \left(\frac{cT_{AP}}{2}\right) \times \frac{\text{Counter 2}}{\text{Counter 1} + \text{Counter 2}}$$

wherein $D_1$ is the distance between the light source and an object where the incident light is reflected; c is the speed of light; $T_{AP}$ is an pulse width of the in-phase pulse or the out-phase pulse; and counter 1 and counter 2 are the outputs from the first and second counters 316-1, 316-2, respectively.

In the illustrated embodiments, the logical control unit receives signals from the first and the second counters 316-1, 316-2 to determine a distance when the system operates under DTOF mode (i.e., the counters receiving signals from the second component 308) according to the equation below:

$$D_2 = \left(\frac{cT_{CLK}}{2}\right) \times (\text{Counter 2} - \text{Counter 1})$$

wherein $D_2$ is the distance between the light source and an object where the incident light is reflected; c is the speed of light; $T_{CLK}$ is a period of the CLK pulses; and counter 1 and counter 2 are the outputs from the first and second counter 316-1/316-2, respectively.

In some embodiments, the logical circuit 110 first enable the second component 308 by enabling the CLK pulses from the global PLL unit 112 and disable the input pulses on the first component 306 (i.e., in-phase and out-phase pulses), allowing the system operating under the DTOF mode. When the value of (counter 2–counter 1) is greater than N, wherein N is a predetermined positive integer, the logical control unit 110 continues to allow the system to operating under the DTOF mode; and when the value of (counter 2–counter 1) is less than N, the logical control unit 110 disable the CLK inputs to the second components 308 and enables the input pulses to the first component 306, allowing the system to operate in the ITOF mode. In some embodiments, a default value of N is equal to 1.

Figure 3B:
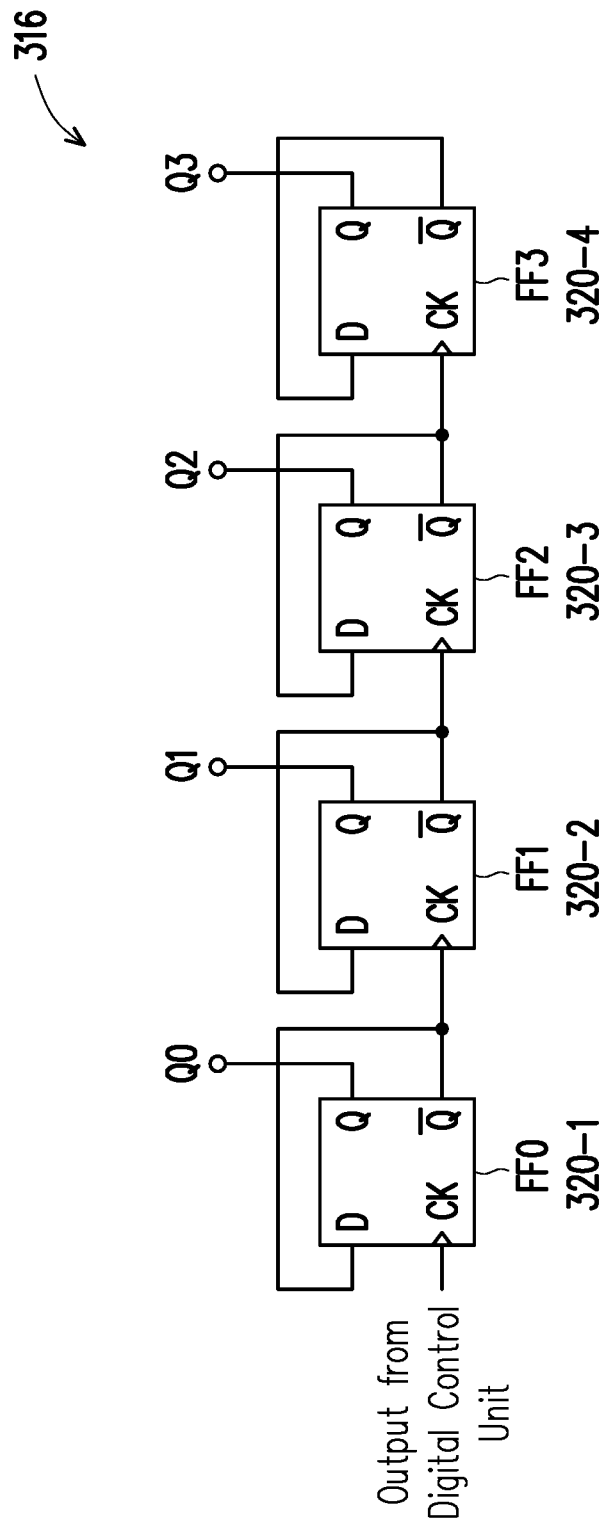
FIG. 3B illustrates an exemplary circuit of a 4-bit counter of a time-of-flight (TOF) sensing system, in accordance with some embodiments of the present disclosure.

FIG. 3B illustrates an exemplary circuit 316 of a 4-bit counter, in accordance with some embodiments of the present disclosure. In the illustrated embodiment, the counter 316 comprises 4 DFF circuits 320, including a first DFF circuit FF0 320-1, a second DFF circuit FF1 320-2, a third DFF circuit FF2 320-3, and a fourth DFF circuit FF3 320-4. Although 4 DFF circuits 320 are used in the exemplary circuit of a 4-bit counter,| it should be noted that any number (N) of DFF circuits can be included in an N-bit counter and are within the scope of this invention.

In the illustrated embodiments, terminal D and terminal Q-bar of each one of the four DFF circuits 320 are coupled together. The terminals Q-bar of the first, second and third DFF circuits 320-1/320-2/320-3 are coupled to terminals CK of the second, third and fourth DFF circuits 320-2/320-3/320-4, respectively. Terminal CK of the first DFF circuit 320-1 is coupled to a CLK signal. Terminals Q of the four DFF circuits 320 are coupled to output Q0, Q1, Q2, and Q3, respectively.

During operation, when no pulse is received on the CK terminal of the first DFF circuit 320-1 from a digital control unit (e.g., first component 306 or second component 308), terminals Q0, Q1, Q2, and Q3 each outputs a "0". When a first pulse is received on the CK terminal of the first DFF circuit 320-1, terminals Q0, Q1, Q2, and Q3 outputs 1, 0, 0, and 0, respectively; when a second pulse is received on the CK terminal of the first DFF circuit 320-1, terminals Q0, Q1, Q2, and Q3 outputs 0, 1, 0, and 0, respectively; when a third pulse is received on the CK terminal of the first DFF circuit 320-1, terminals Q0, Q1, Q2, and Q3 outputs 0, 0, 1, and 0, respectively; and when a fourth pulse is received on the CK terminal of the first DFF circuit 320-1, terminals Q0, Q1, Q2, and Q3 outputs 0, 0, 0, and 1, respectively.

Figure 4:
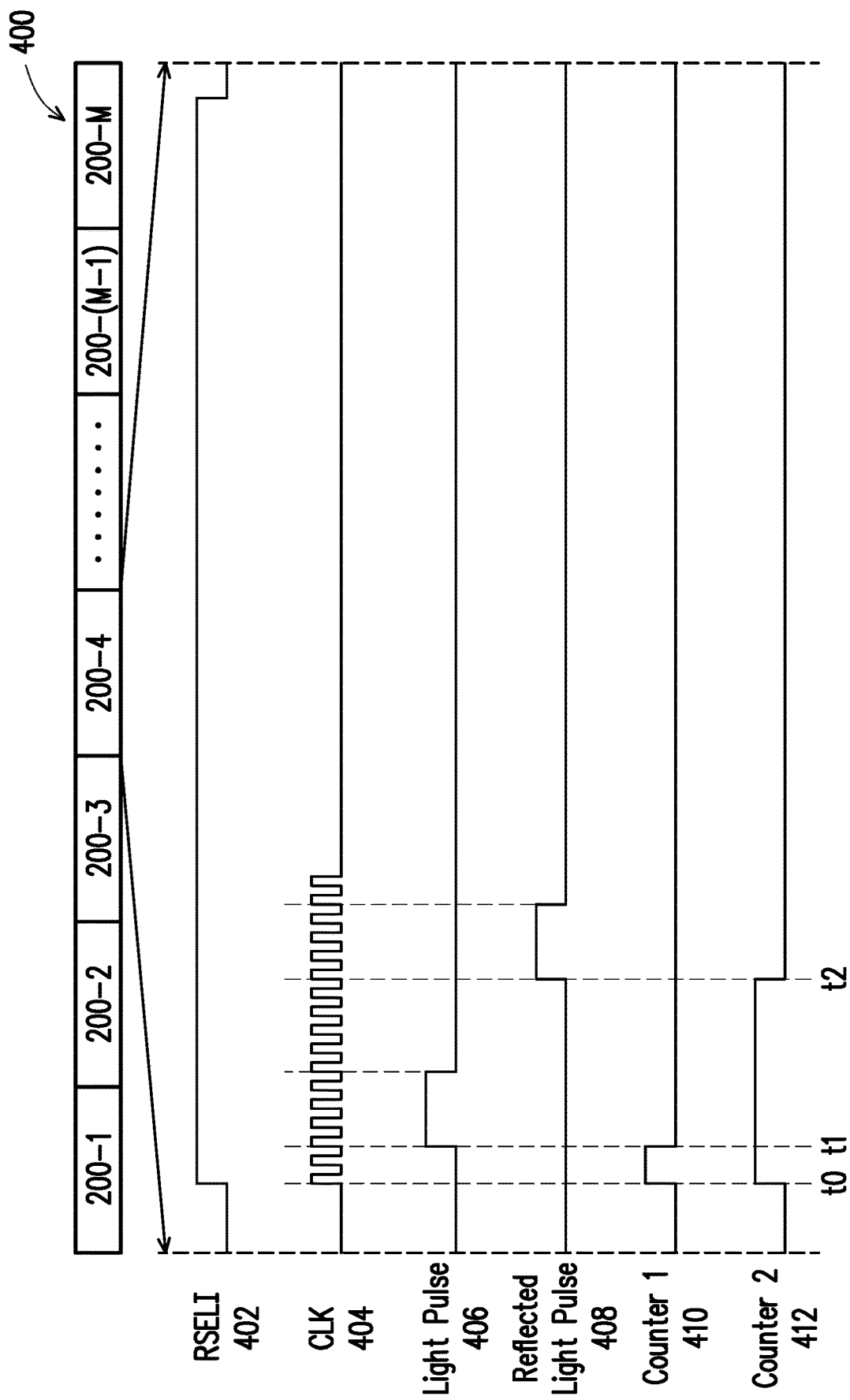
FIG. 4 illustrate waveforms of signals in a time-of-flight (TOF) sensing system operating in the DTOF mode, in accordance with some embodiments of the present disclosure.

FIG. 4 illustrate waveforms 400 of signals in a time-of-flight (TOF) system 300 operating in the DTOF mode, in accordance with some embodiments of the present disclosure. In some embodiments, the operations of the TOF system 300 when producing the waveforms 400 are performed by the respective components illustrated in FIGS. 1-3. For purposes of discussion, the following embodiment of the waveforms 400 will be described in conjunction with FIGS. 1-3. The illustrated embodiment of the waveforms 400 is merely an example for generating inputs to counters from one SPAD 200 in a row and a column (e.g., 200-4) of a SPAD array 102. Therefore, waveforms from other SPADs 200 or from repeated measurement can be added while remaining within the scope of the present disclosure.

When RSELI 402 is enabled (i.e., the voltage level is turned high), and when there is no LASER start light pulse received on the first DFF circuit 312 and thus the E terminals on the third and fourth latches 314-3/314-4 receive no logical "low" signals from the Q-bar terminal of the first and second DFF circuits 312-1/312-2, respectively, the third and fourth latches 314-3/314-4 are turned on. In this case, when a first CLK pulse 404 starts to arrive at the third and fourth latches 314-3/314-4 at t0, the CLK pulses 404 is directed to a first counter 316-1 and the 316-2 simultaneously, resulting Counter 1 410 and Counter 2 412 switch from low to high at the time t0.

When a rising edge of the LASER start light pulse 406 is received on the first DFF circuit 312-1 at time t1, a voltage level on the Q-bar terminal of the first DFF circuit 312-1 switches from high to low. The low signal on the terminal E of the third latch 314-3 stops the output of the CLK on the terminal Q of the third latch 314-3, resulting in a stop of the first counter 316-1. In this case, the Counter 1 410 switches from high to low at the time t1, while the Counter 2 412 continues. When a rising edge of a reflected light pulse 408 is received on the second DFF circuit 312-2, a voltage level on Q-bar terminal of the second DFF circuit 312-2 switches from high to low. The low signal on terminal E of the fourth latch 314-4 stops the output of the CLK on the terminal Q of the fourth latch 314-4, resulting in a stop of the second counter 316-2. In this case, the Counter 1 410 remains low and the Counter 2 412 switches from high to low at time t2. In some embodiments, the time difference between the time t2 and time t1 determines the value of Counter 2−Counter 1, which can be further used to determine the distance D2 when the system operates in the DTOF mode.

For an example, when $T_{CLK}$ equals 1 nanosecond which can be obtained from a global PLL unit 112 operating at 1 gigaHertz, a minimum distance $$D2\_min = \frac{2 \times 10^2 \times 1 \text{ ns}}{2} \times 1 = 0.15 \text{ meter}.$$

When a TDC length is 9 bit which equals $2^8=512$ codes, a maximum distance $$D2\_max = \frac{2 \times 10^2 \times 1 \text{ ns}}{2} \times 512 = 76.8 \text{ meter},$$

when the system operates in the DTOF mode. When a period of the input pulses (i.e., in-phase or out-phase pulse) equals 10 nanosecond, a pulse width is 5 nanosecond. In this case, when a cycle number is 1000, a minimum distance $$D1\_min = \frac{2 \times 10^2 \times 3 \text{ ns}}{2} \times \frac{1}{1000} = 0.75 \text{ millimeter},$$

and a maximum distance $$D1\_max = \frac{2 \times 10^2 \times 3 \text{ ns}}{2} \times \frac{1000}{1000} = 0.75 \text{ meter}.$$

By being able to operate the system in 2 different modes (i.e., DTOF and ITOF modes), a dynamic range can be improved by using the method and apparatus in this present disclosure.

Figure 5:
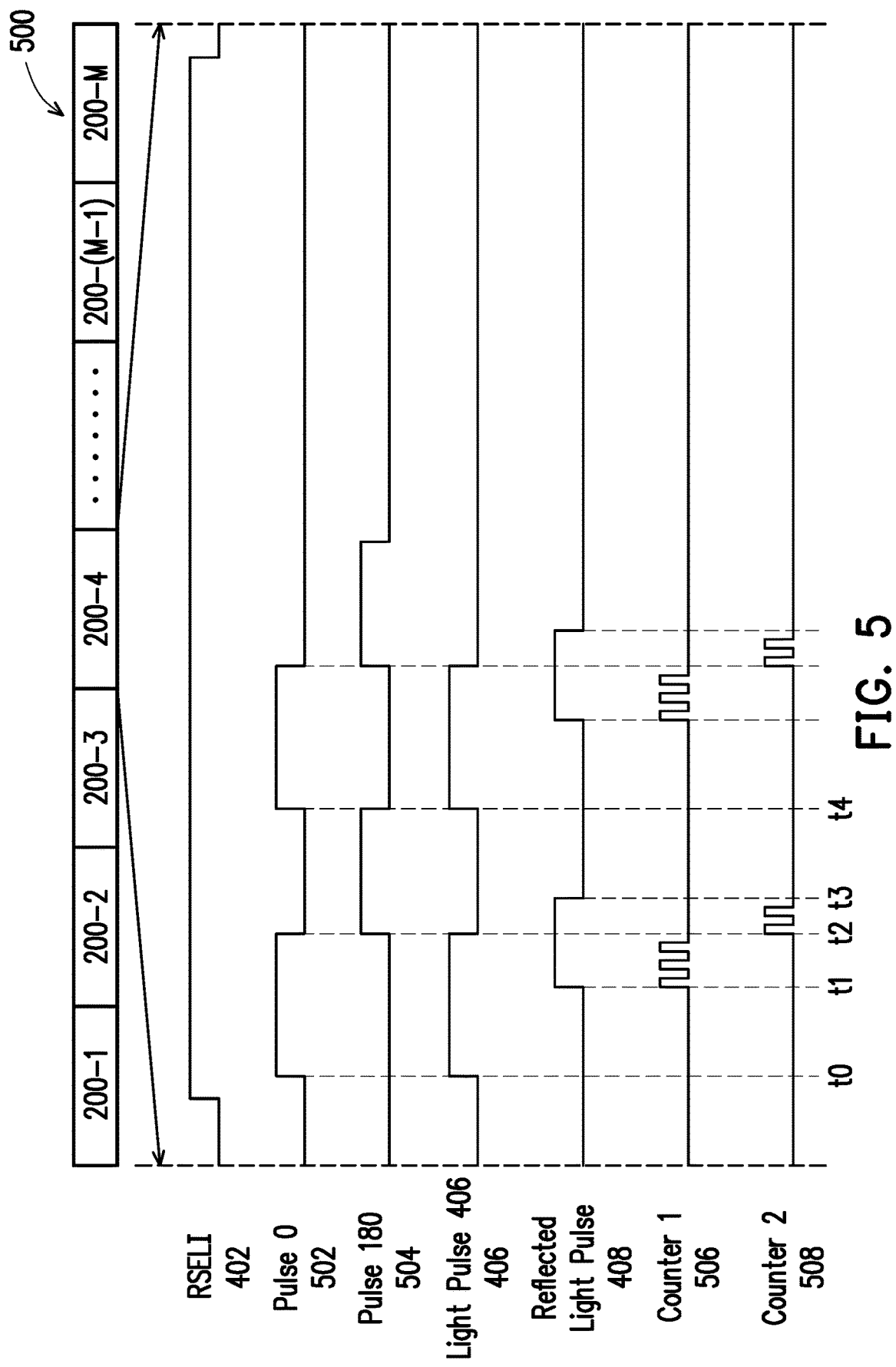
FIG. 5 illustrate waveforms of signals to a time-of-flight (TOF) sensing system operating in an ITOF mode, in accordance with some embodiments of the present disclosure.

FIG. 5 illustrate waveforms 500 of signals to a time-of-flight (TOF) sensor 300 operating in an ITOF mode, in accordance with some embodiments of the present disclosure. In some embodiments, the operations of the TOF system 300 when producing the waveforms 500 are performed by the respective components illustrated in FIGS. 1-3. For purposes of discussion, the following embodiment of the waveforms 500 will be described in conjunction with FIGS. 1-3. The illustrated embodiment of the waveforms 500 is merely an example for generating inputs to counters from one SPAD 200 in a row and a column (e.g., 200-4) of a SPAD array 102. Therefore, waveforms from other SPADs 200 or from repeated measurement can be added while remaining within the scope of the present disclosure.

When RSELI 402 is enabled (i.e., the voltage level is turned high), and when a rising edge of a LASER start light pulse 406 is received on a first latch 314-1 at time t0. When a rising edge of a reflected light pulse 408 at time t1 is received on a SPAD 200, avalanche pulses are generated until a falling edge of the reflected light pulse 408 is received at time t3. In the illustrated embodiments, five avalanche pulses are generated from the SPAD 200 within the period of the reflected light pulse 408 (i.e., t3-t1). It should be noted that 5 avalanche pulses are just an example and does not intend to be limiting. The number of avalanche pulses is determined by the SPAD 200 and the period of the light pulse 406 and thus the period of the reflected light pulse 408 and any number of avalanche pulses is within the scope of this invention.

When an input pulse 0 (i.e., in-phase pulse) 502 is received at the time t0 and stops at time t2 and when an input pulse 180 (i.e., out-phase pulse) 504 is received at the time t2 and stops at time t4, the avalanche pulses (first 3 pulses) within the time period between t2 and t1 are directed to a first counter 316-1, resulting in 3 pulses between the time t2 and t1 on the Counter 1 506. Similarly, the avalanche pulses (last 2 pulses) within the time period between time t3 and t2 are directed to a second counter 316-2, resulting in 2 pulses between the time t3 and t2 on the Counter 2 508.

Figure 6:
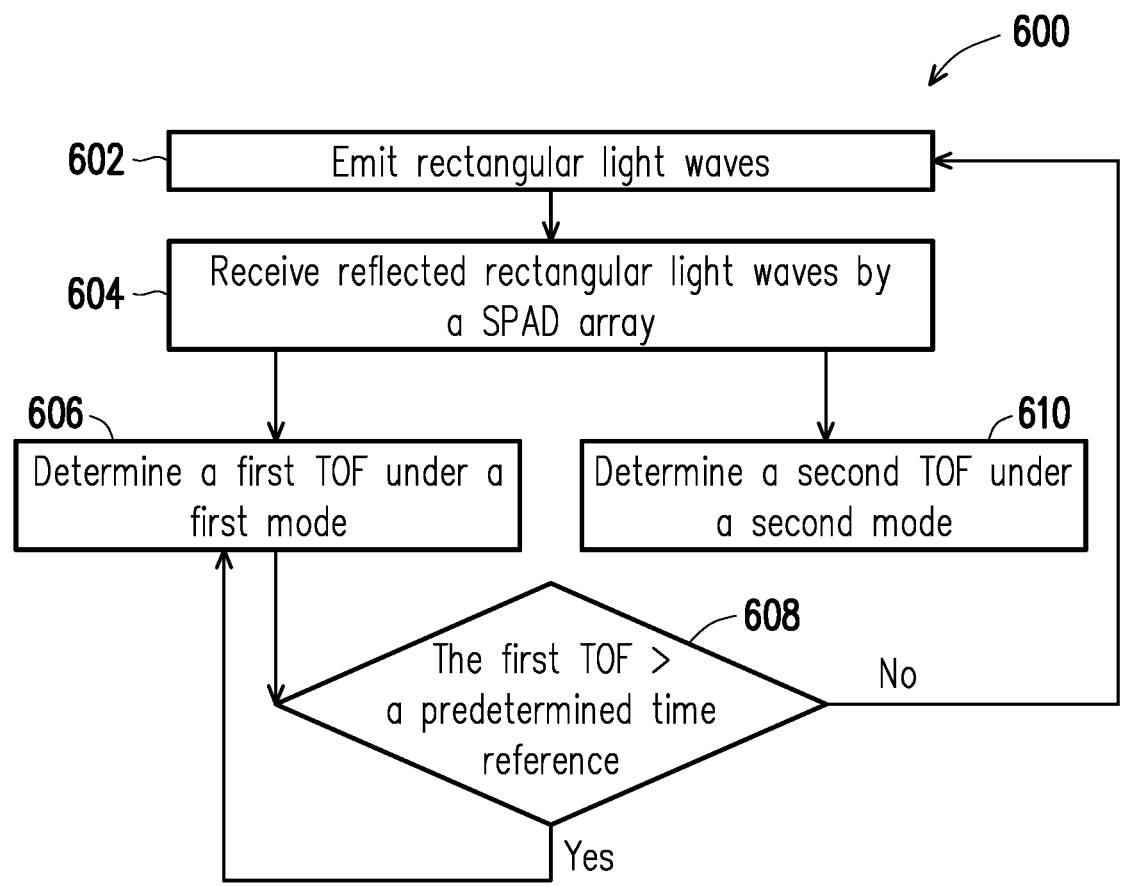
FIG. 6 illustrates a flow chart of a method to perform a time-of-flight (TOF) measurement using a TOF sensing system, in accordance with some embodiments of present disclosure.

FIG. 6 illustrates a flow chart of a method 600 to perform a time-of-flight (TOF) measurement using a TOF sensing system 100, in accordance with some embodiments of present disclosure. In some embodiments, the operations of method 600 are performed by the respective components illustrated in FIGS. 1-3. For purposes of discussion, the following embodiment of the method 600 will be described in conjunction with FIGS. 1-3. The illustrated embodiment of the method 600 is merely an example for performing a TOF measurement. Therefore, it should be understood that any of a variety of operations may be omitted, re-sequenced, and/or added while remaining within the scope of the present disclosure.

The method 600 starts with operation 602 in which at least one light pulse is generated according to some embodiments. In some embodiments, the at least one light pulse is generated and emitted from a light source. In some embodiments, the at least one light pulse each has a rectangular waveform. In some embodiments, the light source can be a pulsed laser or a pulsed light-emitting diode (LED). In some embodiments, the light from the light source can be also modulated. In some embodiments, the light source produces infrared (IR) light. In some embodiments, the light source can scan objects or scene under measurement.

The method 600 continues with operation 604 in which at least one reflected light pulse is received by a photo-detecting unit according to some embodiments. In some embodiments, the photo-detecting unit comprises a single-photon avalanche diode (SPAD). The SPAD 200 comprises a photodiode 202, which relies on impact ionization effects to multiply photo-generated electrons and holes. In some embodiments, the photodiode 202 can be fabricated in a silicon wafer or through a standard Complementary metal-oxide-semiconductor (CMOS) manufacturing process. In some embodiments, the photodiode 202 can be fabricated using group III-V semiconducting materials. In some embodiments, the photo-detecting unit further comprises associated optics, e.g., lens to gather the reflected light to the photodiode 202, band-pass filter to reduce noise.

The method 600 continues with operation 606 in which a first distance is determined under a first detection mode according to some embodiments. In some embodiments, the first detection mode is a direct time-of-flight (DTOF) mode. In some embodiments, a second component 308 of a digital control unit 106 and a counter array 108 are used to determine the first distance. In some embodiments, the second component 308 comprises two identical circuits, wherein the two identical circuits each comprises a D-flip flop (DFF) circuit 312 and a latch 314.

In some embodiments, the second component 308 is configured to operate as a signal edge detector. For example, when the LASER start light pulse is received on the first DFF circuit 312-2, the CLK pulses are blocked by the third latch 314-2 and the output terminal of the third latch 314-3 switches from high to low (i.e., stop COUNTER START); and when the input avalanche pulses are received on the second DFF circuit 312-2, the CLK pluses are blocked by the fourth latch 314-4, and the output terminal of the fourth latch 314-4 switches from high to low (i.e., stop COUNTER STOP).

In the illustrated embodiments, the logical control unit receives signals from the first and the second counters 316-1/316-2 to determine a distance when the system operates under DTOF mode (i.e., the counters receiving signals from the second component 308) according to the equation below:

$$D_2 = \left(\frac{cT_{CLK}}{2}\right) \times (\text{Counter 2} - \text{Counter 1})$$

wherein $D_2$ is the distance between the light source and an object where the incident light is reflected; c is the speed of light; $T_{CLK}$ is a period of the CLK pulses; and counter 1 and counter 2 are the outputs from the first and second counter 316-1/316-2, respectively.

The method 600 continues with operation 608 in which the value of (counter 2–counter 1) is determined and compared to a predetermined time reference. In some embodiments, when the value of (counter 2–counter 1) is greater than N, wherein N is the predetermined positive integer, the method 600 continues with operation 606 to allow the system to continue operating under the DTOF mode. In some other embodiments, when the value of (counter 2–counter 1) is less than N, the method 600 continues with operation 602, 604 and further 610, in which a second distance is determined under a second operation mode according to some embodiments. In some embodiments, the second mode is an indirect time-of-flight (ITOF) mode. In some embodiments, the logical control unit 110 disables the CLK inputs to the second components 308 and enables the input pulses to the first component 306, allowing the system to switch to the ITOF mode.

In some embodiments, the first component 306 is configured to operate as a logic multiplexer. For example, during an in-phase period (e.g., a period where the in-phase pulse is high on the terminal D of the first latch 314-1 and the out-phase pulse is low on the terminal D of the second latch 314-2), the input avalanche pulses from a SPAD 200 in the column are all output into the first counter 316-1. Similarly, during an out-of-phase period (e.g., a period where the in-phase pulse is low on the terminal D of the first latch 314-1 and the out-phase pulse is high on the terminal D of the second latch 314-2), all avalanche pulses from the SPAD 200 in the column are then output into the second counter 316-2. In some embodiments, the first component 306 is configured as a "Gated Clock Latch" so as to prevent a glitch issue which occurs at the edge between the in-phase and the out-of-phase clock. In some embodiments, the first component 306 allows an input avalanche pulse at the edge of the two phases (i.e., in-phase and out-phase pulses) being count into the first counter 316-1 only instead of being counted twice.

In the illustrated embodiments, the logical control unit receives signals from the first and the second counters 316-1/316-2 to determine a distance when the system operates under ITOF mode (i.e., the counters receiving signals from the first component 306) according to the equation below:

$$D_1 = \left(\frac{cT_{AP}}{2}\right) \times \frac{\text{Counter 2}}{\text{Counter 1} + \text{Counter 2}}$$

wherein $D_1$ is the distance between the light source and an object where the incident light is reflected; c is the speed of light; $T_{AP}$ is a pulse width of the in-phase pulse or the out-phase pulse; and counter 1 and counter 2 are the outputs from the first and second counter 316-1/316-2, respectively.

In some embodiments, the first and second distances are measured multiple times and actual distances can be determined statistically using a histogram.

Figure 7:
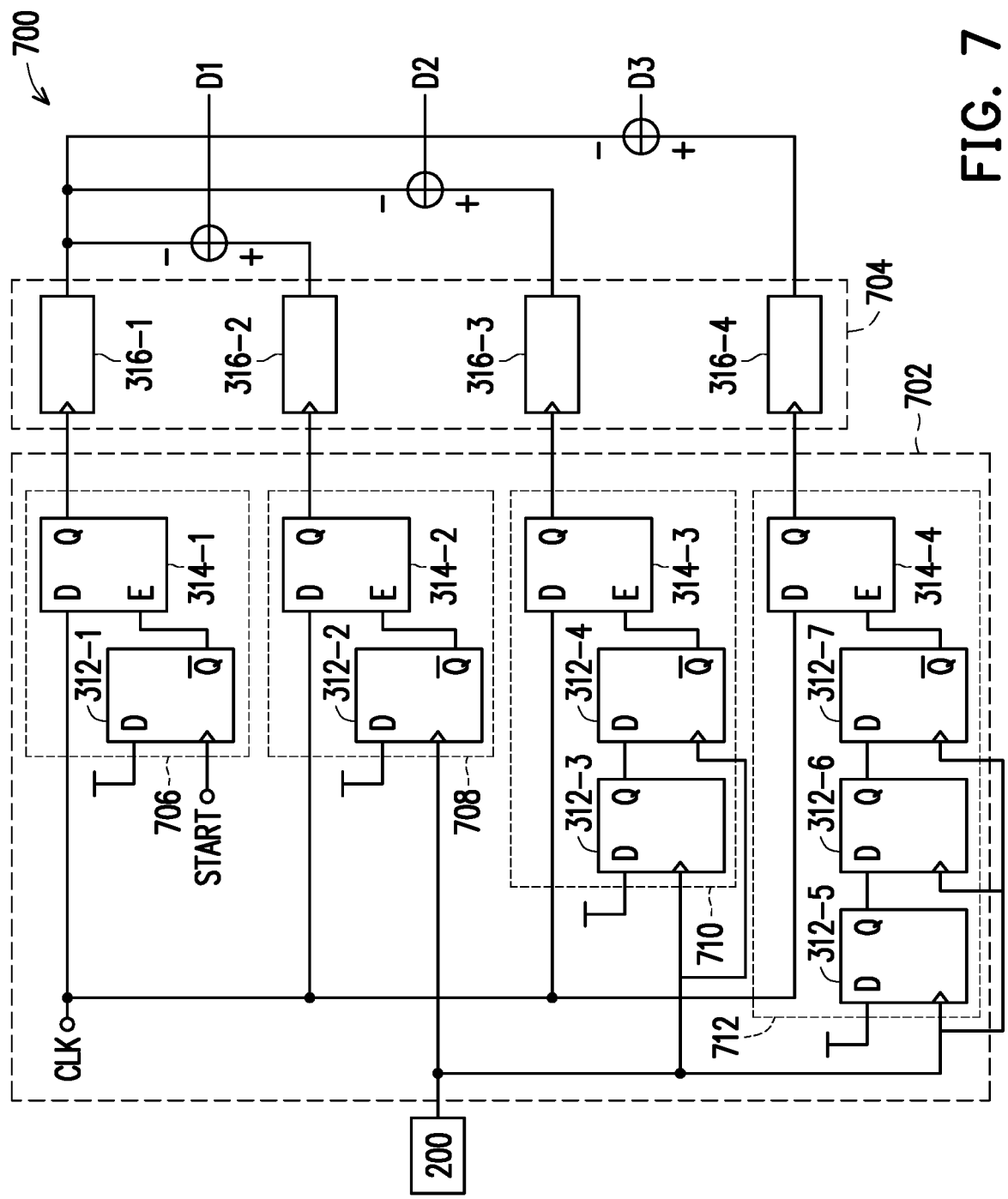
FIG. 7 illustrates an exemplary circuit diagram of a time-of-flight (TOF) sensing system, in accordance with some embodiments of the present disclosure.

FIG. 7 illustrates an exemplary circuit diagram of a time-of-flight (TOF) sensing system 700, in accordance with some embodiments of the present disclosure. In some embodiments, the TOF sensing system 700 comprises a sub-unit 702 of a logical control unit 106 and a counter unit 704 of a counter array 108. In some embodiments, the TOF sensing circuit 700 is coupled to a column of SPADs 200 in a SPAD array 102 for receiving avalanche pulses and further coupled to a logical control unit 110 for determining a distance.

In some embodiments, the sub-unit 702 of the logical control unit comprises a first digital switches 706, a second digital switch 708, a third digital switch 710, and a fourth digital switch 712. The first digital switch 706 comprises a first DFF circuit 312-1 and a first latch 314-1; the second digital switch 708 comprises a second DFF circuit 312-2 and a second latch 314-2; the third digital switch 710 comprises a third DFF circuit 312-3, a fourth DFF circuit 312-4, and a third latch 314-3; and the fourth digital switch 712 comprises a fifth DFF circuit 312-5, a sixth DFF circuit 312-6, a seventh DFF circuit 312-7, and a fourth latch 314-4.

In the illustrated embodiments, terminal D of the first DFF circuit 312-1 fixes into a logic "high" signal; terminal C of the first DFF circuit 312-1 receives an input pulse signal (i.e., LASER start light pulse); and terminal Q-bar of the first DFF circuit 312-1 is coupled to terminal E of the first latch 314-1. In the illustrated embodiment, terminal D of the first latch 314-1 receives a clock signal (i.e., CLK) from the global PLL unit 112; and terminal Q of the first latch 314-1 is finally coupled to the first counter 316-1.

In some embodiments, the counter unit 704 comprises four counters 316, including a first counter 316-1, a second counter 316-2, a third counter 316-3, and a fourth counter 316-4. In some embodiments, the first, second, third and fourth counters 316-1/316-2/316-3/316-4 are coupled to the first, second, third and fourth digital switch 706/708/710/712, respectively.

Similarly, terminal D of the second DFF circuit 312-2 fixes into a logic "high" signal; terminal C of the second DFF circuit 312-2 receives the input pulse signals (i.e., avalanche pulses) from the column of SPADs 200 in the SPAD array 102; and terminal Q-bar of the second DFF circuit 312-2 is coupled to terminal E of the second latch 314-2. In the illustrated embodiment, terminal D of the second latch 314-2 receives a clock signal (i.e., CLK) from the global PLL unit 112; and terminal Q of the second latch 314-2 is finally coupled to the second counter 316-2.

Similarly, terminal D of the third DFF circuit 312-3 fixes into a logic "high" signal; terminal C of the third DFF circuit 312-3 receives the input pulse signals (i.e., avalanche pulses) from the column of SPADs 200 in the SPAD array 102; and terminal Q of the third DFF circuit 312-3 is coupled to terminal D of the fourth DFF circuit 312-4. Terminal Q-bar of the fourth DFF circuit 312-4 is coupled to terminal E of the third latch 314-3. In the illustrated embodiment, terminal D of the third latch 314-3 receives a clock signal (i.e., CLK) from the global PLL unit 112; and terminal Q of the third latch 314-3 is finally coupled to the third counter 316-3.

Similarly, terminal D of the fifth DFF circuit 312-5 fixes into a logic "high" signal; terminal C of the fifth DFF circuit 312-5 receives the input pulse signals (i.e., avalanche pulses) from the column of SPADs 200 in the SPAD array 102; and terminal Q of the fifth DFF circuit 312-5 is coupled to terminal D of the sixth DFF circuit 312-6. Terminal Q of the sixth DFF circuit 312-6 is coupled to terminal D of the seventh DFF circuit 312-7. Terminal Q-bar of the seventh DFF circuit 312-7 is coupled to terminal E of the fourth latch 314-4. In the illustrated embodiment, terminal D of the fourth latch 314-4 receives a clock signal (i.e., CLK) from the global PLL unit 112; and terminal Q of the fourth latch 314-4 is finally coupled to the fourth counter 316-4.

In some embodiments, the digital control unit 702 is configured to operate as a signal edge detector. For example, when the LASER start light pulse is received on the first DFF circuit 312-1, the CLK pulses are blocked by the first latch 314-1 and the output terminal of the first latch 314-1 switches from high to low (i.e., stop COUNTER START); and when the input avalanche pulses are received on the second DFF circuit 312-2, the CLK pluses are blocked by the second latch 314-2, and the output terminal of the second latch 314-2 switches from high to low (i.e., stop COUNTER 2); when the input avalanche pulses are received on the third DFF circuit 312-3, the CLK pulses are blocked by the third latch 314-3 when two avalanche pulses are received and the output terminal of the third latch 314-3 switches from high to low (stop COUNTER 3); AND when the input avalanche pulses are received on the fifth DFF circuit 312-5, the CLK pulses are blocked by the fourth latch 314-3 when three avalanche pulse are received and the output terminal of the fourth latch 314-4 switches from high to low (stop COUNTER 4).

In the illustrated embodiments, the digital control unit 706 allows the system operating in the DTOF mode. In some embodiments, the TDC circuit 700 allows determination of three distance values based on the time differences, i.e., Counter 2 and Counter 1, Counter 3 and Counter 1, and Counter 4 and Counter 1. In some embodiments, a first distance, a second distance and a third distance can be determined using equations below, $$D_1 = \left(\frac{cT_{CLK}}{2}\right) \times (\text{Counter } 2 - \text{Counter } 1)$$

$$D_2 = \left(\frac{cT_{CLK}}{2}\right) \times (\text{Counter } 3 - \text{Counter } 1)$$

$$D_3 = \left(\frac{cT_{CLK}}{2}\right) \times (\text{Counter } 4 - \text{Counter } 1)$$

wherein $D_1$, $D_2$ and $D_3$ are the distances between the light source and an object where the incident light is reflected; c is the speed of light; $T_{CLK}$ is a pulse width of the CLK pulses; and counter 1, counter 2, counter 3 and counter 4 are the outputs from the first, second, third and fourth counter 316-1/316-2/316-3/316-4, respectively. This configuration provides an efficient determination of the distance statistically by detecting multiple avalanche pulses in the DTOF mode.

Figure 8:
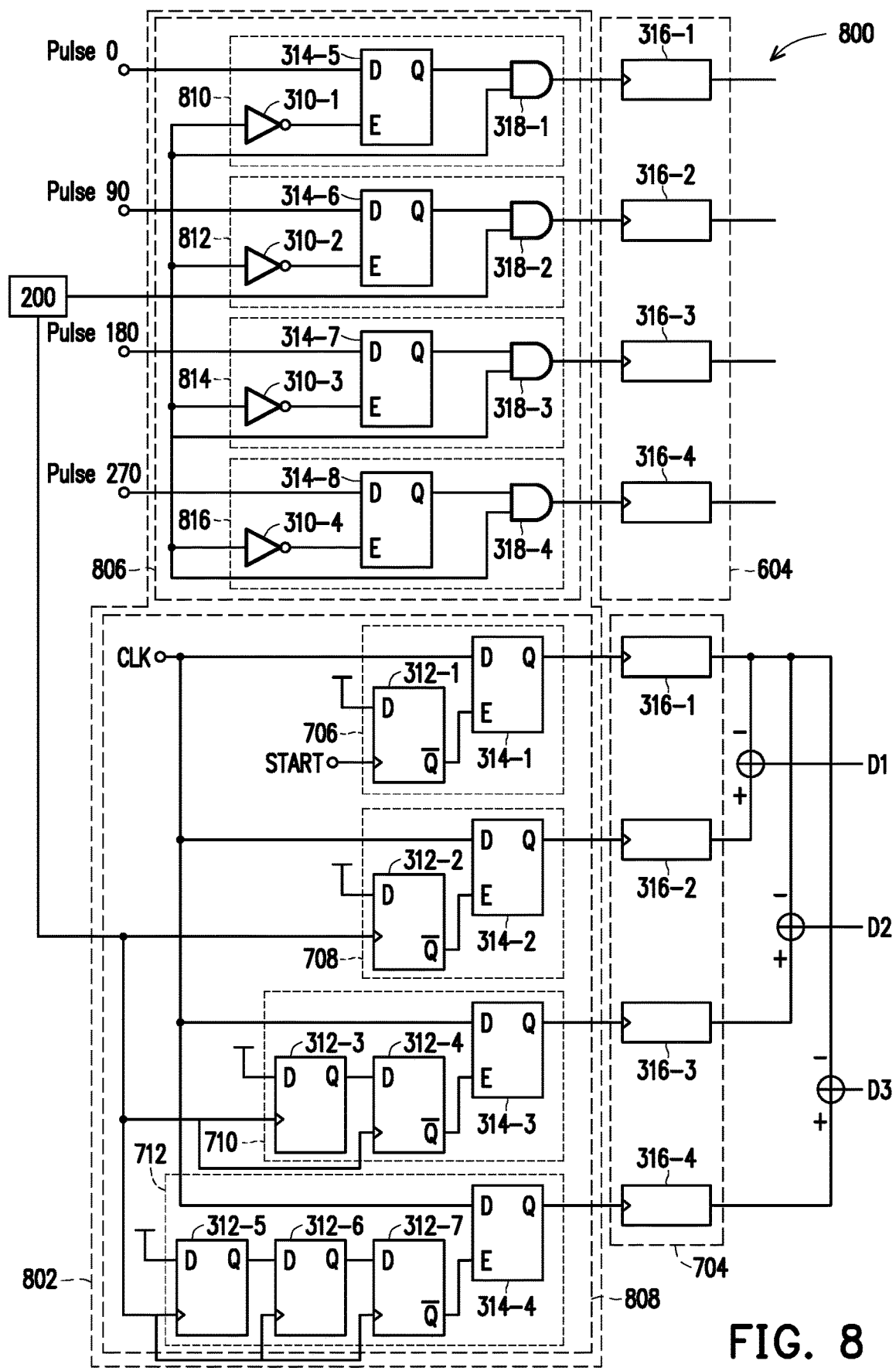
FIG. 8 illustrates an exemplary circuit diagram of a time-of-flight (TOF) sensing system, in accordance with some embodiments of the present disclosure.

FIG. 8 illustrates an exemplary circuit diagram of a time-of-flight (TOF) sensing system 800, in accordance with some embodiments of the present disclosure. In some embodiments, the TOF sensing system 800 comprises a sub-unit 802 of a logical control unit 110 and a counter unit 704 of a counter array 108. In some embodiments, the TOF sensing system 800 further comprises a column of SPADs 200 in a SPAD array 102 for receiving avalanche pulses and further coupled to a logical control unit 110 for determining a distance.

In some embodiments, the sub-unit 802 of the logical control unit 110 comprises two components: a first component 806 and a second component 808. The first component 806 comprises a first digital switch 810, a second digital switch 812, a third digital switch 814, and a fourth digital switch 816. Each of the four digital switches 810/812/814/816 comprises an inverter 310, a latch 314 and an "AND" gate 318. In the illustrated embodiment, terminal D of the first latch 314-5 in the first component 806 receives an input pulse signal (i.e., a 0-degree phase pulse); terminal E of the first latch 314-5 in the first component 806 receives an input pulse signal (i.e., avalanche pulses) from a column of SPADs 200 in the SPAD array 102 through the first inverter 310-1; and terminal Q of the first latch 314-5 in the first component 806 and the input pulse signals from the column of SPADs 200 in the SPAD array 102 are further coupled to the first "AND" gate 318-1. In the illustrated embodiments, output terminal of the first "AND" gate 318-1 is further coupled to the first counter 316-1.

Similarly, terminal D of the second latch 314-6 in the first component 806 receives an input pulse signal (i.e., an 90-degree phase pulse); terminal E of the second latch 314-6 in the first component 806 receives an input pulse signal (i.e., avalanche pulses) from a column of SPADs 200 in the SPAD array 102 through the second inverter 310-2; and terminal Q of the second latch 314-6 in the first component 806 and the input pulse signals (i.e., avalanche pulses) from the column of SPADs 200 in the SPAD array 102 are further coupled to the second "AND" gate 318-2. In the illustrated embodiments, output terminal of the second "AND" gate 318-2 is further coupled to the second counter 316-2.

Similarly, terminal D of the third latch 314-7 in the first component 806 receives an input pulse signal (i.e., an 180-degree phase pulse); terminal E of the third latch 314-7 in the first component 806 receives an input pulse signal (i.e., avalanche pulses) from a column of SPADs 200 in the SPAD array 102 through the third inverter 310-3; and terminal Q of the third latch 314-7 in the first component 806 and the input pulse signals (i.e., avalanche pulses) from the column of SPADs 200 in the SPAD array 102 are further coupled to the third "AND" gate 318-3. In the illustrated embodiments, output terminal of the third "AND" gate 318-3 is further coupled to the third counter 316-3.

Similarly, terminal D of the fourth latch 314-8 in the first component 806 receives an input pulse signal (i.e., an 270-degree phase pulse); terminal E of the fourth latch 314-8 in the first component 806 receives an input pulse signal (i.e., avalanche pulses) from a column of SPADs 200 in the SPAD array 102 through the fourth inverter 310-4; and terminal Q of the fourth latch 314-8 in the first component 806 and the input pulse signals (i.e., avalanche pulses) from the column of SPADs 200 in the SPAD array 102 are further coupled to the fourth "AND" gate 318-4. In the illustrated embodiments, output terminal of the fourth "AND" gate 318-4 is further coupled to the fourth counters 316-4.

In some embodiments, the first component 806 is configured to operate as a logic multiplexer. For example, during the 0-degree phase period (e.g., a period where the 0-degree phase pulse is high on the terminal D of the first latch 314-5, and the 90-degree, 180-degree and 270-degree pulses are low on the terminals D of the second latch 314-6, the third latch 314-7, and the fourth latch 314-8, respectively), the input avalanche pulses from a SPAD 200 in the column are all output into the first counter 316-1. Similarly, during the 90-degree phase period (e.g., a period where the 0-degree phase, 180-degree phase, and the 270-degree phase pulses are low on the terminals D of the first latch 314-5, the third latch 314-7, and the fourth latch 314-8, and the 90-degree phase pulse is high on the terminal D of the second latch 314-6), all avalanche pulses from the SPAD 200 in the column are then output into the second counter 316-2. Similarly, during the 180-degree phase period (e.g., a period where the 0-degree phase, 90-degree phase, and the 270-degree phase pulses are low on the terminals D of the first latch 314-5, the second latch 314-6, and the fourth latch 314-8, and the 180-degree phase pulse is high on the terminal D of the third latch 314-7), all avalanche pulses from the SPAD 200 in the column are then output into the third counter 316-3. Similarly, during the 270-degree phase period (e.g., a period where the 0-degree phase, the 90-degree phase, and the 180-degree phase pulses are low on the terminals D of the first latch 314-5, the second latch 314-6, and the third latch 314-7, and the 270-degree phase pulse is high on the terminal D of the fourth latch 314-8), all avalanche pulses from the SPAR 200 in the column are then output into the fourth counter 316-8. In some embodiments, the first component 806 is configured as a "Gated Clock Latch" so as to prevent a glitch issue which occurs at the edge between the two adjacent phase pulses. In some embodiments, the first component 806 allows an input avalanche pulse at the edge of the two adjacent phases (i.e., 0-degree pulse and 90-degree pulse, 90-degree pulse and 180-degree pulse, 180-degree pulse and 270-degree pulse, and 270-degree pulse and 0-degree pulse) to be counted into the counter only once instead of being counted twice.

In the illustrated embodiments, the logical control unit receives signals from the first, the second, the third and the fourth counters 316-1/316-2/316-3/316-4 to determine a distance when the system operates under ITOF mode (i.e., the counters receiving signals from the first component 806) according to the equation below:

$$D_1 = \left(\frac{cT_{AP}}{2}\right) \times \frac{1}{2\pi} \times \tan^{-1}\left(\frac{\text{Counter 4} - \text{Counter 2}}{\text{Counter 1} - \text{Counter 3}}\right)$$

wherein $D_1$ is the distance between the light source and an object where the incident light is reflected; c is the speed of light; $T_{AP}$ is an pulse width of the in-phase pulse or the out-phase pulse; and counter 1 and counter 2 are the outputs from the first and second counter 316-1/316-2, respectively.

The second component 808 comprises a first edge detector 706, a second edge detector 708, a third edge detector 710, and a fourth edge detector 712. The first edge detector 706 comprises a first DFF circuit 312-1 and a first latch 314-1; the second edge detector 708 comprises a second DFF circuit 312-2 and a second latch 314-2; the third edge detector 710 comprises a third DFF circuit 312-3, a fourth DFF circuit 312-4, and a third latch 314-3; and the fourth edge detector 712 comprises a fifth DFF circuit 312-5, a sixth DFF circuit 312-6, a seventh DFF circuit 312-7, and a fourth latch 314-4.

In the illustrated embodiments, terminal D of the first DFF circuit 312-1 fixes into a logic "high" signal; terminal C of the first DFF circuit 312-1 receives an input pulse signal (i.e., LASER start light pulse); and terminal Q-bar of the first DFF circuit 312-1 is coupled to terminal E of the first latch 314-1. In the illustrated embodiment, terminal D of the first latch 314-1 receives a clock signal (i.e., CLK) from the global PLL unit 112; and terminal Q of the first latch 314-1 is finally coupled to the first counter 316-1.

In some embodiments, the counter unit 704 comprises four counters 316, including a first counter 316-1, a second counter 316-2, a third counter 316-3, and a fourth counter 316-4. In some embodiments, the first, second, third and fourth counters 316-1/316-2/316-3/316-4 are coupled to the first, second, third and fourth edge detector 706/708/710/712, respectively.

Similarly, terminal D of the second DFF circuit 312-2 fixes into a logic "high" signal; terminal C of the second DFF circuit 312-2 receives the input pulse signals (i.e., avalanche pulses) from the column of SPADs 200 in the SPAD array 102; and terminal Q-bar of the second DFF circuit 312-2 is coupled to terminal E of the second latch 314-2. In the illustrated embodiment, terminal D of the second latch 314-2 receives a clock signal (i.e., CLK) from the global PLL unit 112; and terminal Q of the second latch 314-2 is finally coupled to the second counter 316-2.

Similarly, terminal D of the third DFF circuit 312-3 fixes into a logic "high" signal; terminal C of the third DFF circuit 312-3 receives the input pulse signals (i.e., avalanche pulses) from the column of SPADs 200 in the SPAD array 102; and terminal Q of the third DFF circuit 312-3 is coupled to terminal D of the fourth DFF circuit 312-4. Terminal Q-bar of the fourth DFF circuit 312-4 is coupled to terminal E of the third latch 314-3. In the illustrated embodiment, terminal D of the third latch 314-3 receives a clock signal (i.e., CLK) from the global PLL unit 112; and terminal Q of the third latch 314-3 is finally coupled to the third counter 316-3.

Similarly, terminal D of the fifth DFF circuit 312-5 fixes into a logic "high" signal; terminal C of the fifth DFF circuit 312-5 receives the input pulse signals (i.e., avalanche pulses) from the column of SPADs 200 in the SPAD array 102; and terminal Q of the fifth DFF circuit 312-5 is coupled to terminal D of the sixth DFF circuit 312-6. Terminal Q of the sixth DFF circuit 312-6 is coupled to terminal D of the seventh DFF circuit 312-7. Terminal D of the seventh DFF circuit 312-7 is coupled to terminal E of the fourth latch 314-4. In the illustrated embodiment, terminal D of the fourth latch 314-4 receives a clock signal (i.e., CLK) from the global PLL unit 112; and terminal Q of the fourth latch 314-4 is finally coupled to the fourth counter 316-4.

In some embodiments, the digital control unit 702 is configured to operate as a signal edge detector. For example, when the LASER start light pulse is received on the first DFF circuit 312-1, the CLK pulses are blocked by the first latch 314-1 and the output terminal of the first latch 314-1 switches from high to low (i.e., stop COUNTER START); and when the input avalanche pulses are received on the second DFF circuit 312-2, the CLK pluses are blocked by the second latch 314-2, and the output terminal of the second latch 314-2 switches from high to low (i.e., stop COUNTER 2); when the input avalanche pulses are received on the third DFF circuit 312-3, the CLK pulses are blocked by the third latch 314-3 when two avalanche pulse are received and the output terminal of the third latch 314-3 switches from high to low (stop COUNTER 3); AND when the input avalanche pulses are received on the fifth DFF circuit 312-5, the CLK pulses are blocked by the fourth latch 314-3 when three avalanche pulse are received and the output terminal of the fourth latch 314-4 switches from high to low (stop COUNTER 4).

In the illustrated embodiments, the digital control unit 706 allows the system operating in the DTOF mode. In some embodiments, the TDC circuit 700 allows determination of three distance values based on the time differences, i.e., Counter 2 and Counter 1, Counter 3 and Counter 1, and Counter 4 and Counter 1. In some embodiments, a first distance, a second distance and a third distance can be determined using equations below, $$D_{2\_1} = \left(\frac{cT_{CLK}}{2}\right) \times (\text{Counter 2} - \text{Counter 1})$$

$$D_{2\_2} = \left(\frac{cT_{CLK}}{2}\right) \times (\text{Counter 3} - \text{Counter 1})$$

$$D_{2\_3} = \left(\frac{cT_{CLK}}{2}\right) \times (\text{Counter 4} - \text{Counter 1})$$

wherein $D_{2\_1}$, $D_{2\_2}$ and $D_{2\_3}$ are the distances between the light source and an object where the incident light is reflected; c is the speed of light; $T_{CLK}$ is a pulse width of the CLK pulses; and counter 1, counter 2, counter 3 and counter 4 are the outputs from the first, second, third and fourth counter 316-1/316-2/316-3/316-4, respectively. This configuration provides an efficient determination of the distance statistically by detecting multiple avalanche pulses in the DTOF mode.

In one embodiment, a system for time-of-flight (TOF) sensing, comprising: a detector array comprising a plurality of single-photon avalanche detectors (SPADs); and a control circuit comprising at least two digital control arrays coupled to the detector array, a counter array coupled to the at least two digital control arrays, and a logical control unit coupled to the counter array and the at least two digital control arrays, wherein the detector array is configured to receive at least one reflected light pulse from a target, wherein a first digital control array, the counter array, and the logical control unit of the control circuit are configured to receive at least one avalanche pulses from each of the plurality of SPADs to determine a first distance between the detector array and the target in a first TOF mode, and wherein a second digital control array, the counter array, and the logical control unit of the control circuit are configured to receive the at least one avalanche pulse from the each of the plurality of SPADs to determine a second distance between the detector array and the target in a second TOF mode.

In another embodiment, a method for Time-of-Flight (TOF) sensing, comprising: receiving at least one reflected light pulse from a target by a detector array; generating at least one avalanche pulses from each of a plurality of single-photon avalanche detectors in the detector array; determining a first distance in a first TOF mode; comparing a time to a predetermined reference time; in response to the time greater than the predetermined reference time, switching from the first TOF mode to a second TOF mode; and determining a second distance in the second TOF mode, wherein the detector array is configured to receive at least one reflected light pulse from a target, wherein the determining a first distance is performed by a first digital control array, a counter array, and a logical control unit of a control circuit, and wherein the determining a second distance is performed by a second digital control array, the counter array, and the logical control unit of the control circuit.

Yet, in another embodiment, a system for Time-of-Flight (TOF) sensing, comprising: a light source configured to emit at least one light pulse to a target; a detector array comprising a plurality of single-photon avalanche detectors (SPADs), wherein the detector is configured to receive at least one reflected light pulse from the target; a first digital control array comprising N corresponding edge detectors; a counter array comprising N counters coupled to the N corresponding edge detectors of the first digital control array; a logical control unit coupled to the counter array configured to determine a first distance in a first TOF mode, wherein N is a positive integer and N is equal to or greater than 4.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for time-of-flight (TOF) sensing, comprising:
a detector array comprising a plurality of single-photon avalanche detectors (SPADs); and
a control circuit comprising
at least two digital control arrays coupled to the detector array,
a counter array coupled to the at least two digital control arrays, and
a logical control unit coupled to the counter array and the at least two digital control arrays,
wherein the detector array is configured to receive at least one reflected light pulse from a target, wherein a first digital control array, the counter array, and the logical control unit of the control circuit are configured to receive at least one avalanche pulse from each of the plurality of SPADs to determine a first distance between the detector array and the target in a first TOF mode, and wherein a second digital control array, the counter array, and the logical control unit of the control circuit are configured to receive the at least one avalanche pulse from the each of the plurality of SPADs to determine a second distance between the detector array and the target in a second TOF mode,
wherein the logical control unit is further configured to compare a time with a predetermined number, wherein in response to the value of the time that is greater than the predetermined number, the logical control unit is configured to enable inputs to the second digital control unit and disable inputs to the first digital control unit so as to switch from the first TOF mode to the second TOF mode such that the system operates in the second TOF mode, wherein the time is determined as a time difference between a first and a second counters in the counter array, and
wherein the first TOF mode is a direct TOF mode and the second TOF mode is an indirect TOF mode.

2. The system of claim 1, wherein the predetermined number is a reference time.

3. The system of claim 1, wherein the first digital control array comprises at least two digital switches.

4. The system of claim 3, wherein each of the at least two digital switches comprises an inverter, a latch, and an AND gate.

5. The system of claim 1, wherein the second digital control array comprises at least two edge detectors.

6. The system of claim 1, wherein the counter array comprises at least two counters, and wherein each of the at least two counters comprises a plurality of D-flip-flop circuits.

7. The system of claim 1, wherein the at least one reflected light pulse is emitted from a light source, wherein the light source is configured to emit at least one light pulse to the target so as to generated the at least one reflected light pulse.

8. A method for Time-of-Flight (TOF) sensing, comprising:
receiving at least one reflected light pulse from a target by a detector array in a system for TOF sensing;
generating at least one avalanche pulses from each of a plurality of single-photon avalanche detectors in the detector array;
determining a first distance in a first TOF mode;
comparing a time to a predetermined reference time;
in response to the time greater than the predetermined reference time, switching from the first TOF mode to a second TOF mode such that the system operates in the second TOF mode, wherein the first TOF mode is a direct TOF mode and the second TOF mode is an indirect TOF mode; and
determining a second distance in the second TOF mode, wherein the detector array is configured to receive at least one reflected light pulse from a target, wherein the determining a first distance is performed by a first digital control array, a counter array, and a logical control unit of a control circuit, and wherein the determining a second distance is performed by a second digital control array, the counter array, and the logical control unit of the control circuit.

9. The method of claim 8, the first digital control array comprises at least two digital switches.

10. The method of claim 9, wherein each of the at least two digital switches comprises an inverter, a latch, and an AND gate.

11. The method of claim 8, wherein the second digital control array comprises at least two edge detectors.

12. The method of claim 8, wherein the first TOF mode is a direct TOF mode and the second TOF mode is an indirect TOF mode.

13. The method of claim 8, wherein the counter array comprises at least two counters, and wherein each of the at least two counters comprises a plurality of D-flip-flop circuits.

14. A system for Time-of-Flight (TOF) sensing, comprising:
a light source configured to emit at least one light pulse to a target;
a detector array comprising a plurality of single-photon avalanche detectors (SPADs), wherein the detector is configured to receive at least one reflected light pulse from the target;
a first digital control array comprising N corresponding edge detectors;
a counter array comprising N counters coupled to the N corresponding edge detectors of the first digital control array;
a logical control unit coupled to the counter array configured to determine a first distance in a first TOF mode;
a second digital control array, comprising N digital switches, wherein the second digital control array is coupled between the detector array and the logical control unit, wherein the second digital control array is to determine a second distance in a second TOF mode,
wherein the logical control unit is further configured to compare a time with a predetermined number, wherein in response to the value of the time that is greater than the predetermined number, the logical control unit is configured to switch from the first TOF mode to the second TOF mode such that the system operates in the second TOF mode, wherein the first TOF mode is a direct TOF mode and the second TOF mode is an indirect TOF mode, and
wherein N is a positive integer and N is equal to or greater than 4.

15. The system of claim 14, wherein each of the N counters comprises a plurality of D-flip-flop circuits.

16. The system of claim 14, wherein each of the N digital switches of the second digital control array comprises an inverter, a latch, and an AND gate.

* * * * *